R. H. McKEE.
ELECTRODE.
APPLICATION FILED NOV. 5, 1920.
1,433,017.
Patented Oct. 24, 1922.
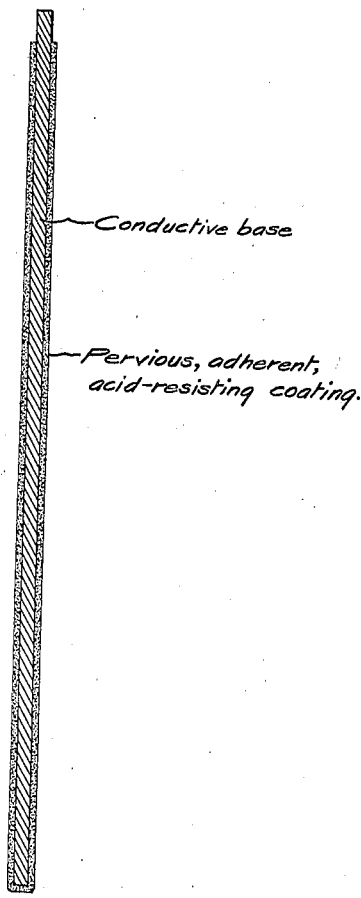

Patented Oct. 24, 1922.

1,433,017

UNITED STATES PATENT OFFICE.

RALPH H. McKEE, OF NEW YORK, N. Y.

ELECTRODE.

Application filed November 5, 1920. Serial No. 422,060.

*To all whom it may concern:*

Be it known that I, RALPH H. McKEE, a citizen of the United States, residing at New York, in the county of New York and State of New York, have invented certain new and useful Improvements in Electrodes, of which the following is a specification.

This invention relates to electrolytic cells of the type employed for the oxidation or reduction of solutions or dissolved substances, whether organic or inorganic; and comprises an electrolytic cell of this type and an electrode for use therein. The electrode in accordance with this invention is capable of being used in either acid or neutral solutions; and in such solutions it may be used either as the anode or as the cathode, according to whether the operation is of the reducing or oxidizing type.

It is well recognized in connection with oxidizing operations in non-acid solutions, that a permeable coating on the cathode will increase the operating efficiency, owing to the fact that the solution is prevented from coming into physical contact with the active cathode surface, and the hydrogen contacts with the solution in molecular form (gas) which is without reducing effect under the working conditions.

For example it has been proposed to use in this manner cathode coatings of calcium hydroxid, magnesium hydroxid, resin soaps or the like. Obviously all of these are utilizable in non-acid solutions only, and they are used in practice only in solutions which are initially alkaline or which become alkaline as the operation proceeds. So far as I am aware, pervious adherent electrode coatings utilizable in acid solutions, and adapted either for oxidizing or reducing operations, that is to say capable of use either in conjunction with the cathode or with the anode, have not heretofore been known.

I provide such coatings by the use of silica or equivalent acid-insoluble oxides or hydrated oxides, preferably in two different physical states, including a component to be bonded and a bonding agent. In the preferred embodiment of the invention the component to be bonded is infusorial earth, while the bonding agent is gelatinous silica or silicic acid. When reference is made to silica it is to be understood that acid-insoluble oxids and hydroxids which may be equivalent to silica for the purposes of this invention are included. Titanium for example is a metal yielding such oxids.

Following is a typical example in accordance with the invention, it being understood that the invention is not restricted to the particular materials, proportions or manipulations specified in the example.

6.5 parts of previously ignited infusorial earth, crushed to pass a 24 mesh screen but retained upon a 100 mesh screen, are made into a cream with about 10 parts of a sodium silicate solution having a specific gravity of around 1.23. Silicate solutions having a relatively high ratio of silica to alkali, (for example $Na_2O:SiO_2=1:3.3$) are preferred. The creamy mass or paste may be applied with a small trowel or otherwise to the surface of the electrodes, which for use in sulfuric acid solutions will preferably be of lead. After drying at room temperatures the plate is dipped into sulfuric acid (say 40% by weight of $H_2SO_4$) and after washing with water is ready for use.

When using such an electrode in a solution the added resistance due to the coating is but moderate, and the construction of the cell becomes extremely simple, the electrolyte simply flowing between the anode and the cathode, one of which is provided with a coating, and being either reduced or oxidized as the case may be in the course of its passage. Using an electrode of this type, sodium dichromate in diluted sulfuric acid solution was reduced with a current efficiency in excess of 80% of theory, the coated electrode being of course in this case the anode. By reversing the current, this solution was then oxidized back to chromic acid with a current efficiency of 80%. The voltage required in the above case was between 2.6 and 3 volts. The invention is equally applicable to the oxidation and reduction of organic substances.

The ignition of the infusorial earth is not necessary but is desirable, since infusorial earth which has not been heated requires a larger proportion of sodium silicate solution to yield a suitable paste than does the ignited product. It is desirable in the paste to employ the maximum practicable proportion of infusorial earth with the minimum proportion of sodium silicate, and it is for this reason that the ignited infusorial earth and the silicate solution having the relatively high ratio of silica to alkali are used. Too great a proportional quantity of sodium silicate yields a coating which tends to shrink and crack, and neither adheres well nor entirely prevents the contact of the metal with the body of the solution.

Other insoluble materials, particularly those of a porous character, may be substituted for the infusorial earth as the component to be bonded; and as above stated other binders may be substituted for the silicic acid. When such binders are less soluble than silicic acid in alkaline solutions the electrode may of course be used in such alkaline solutions as will not have a destructive action. The essential requirements are that the coating should be porous or pervious, adherent, acid-resisting, and preferably relatively thin.

The accompanying drawing illustrates by way of a transverse sectional view an electrode provided in accordance with my invention with a pervious, adherent, acid-resisting coating.

I claim:

1. An electrode comprising a conductive base, and a pervious, adherent, acid-resisting coating applied thereto.

2. An electrode according to claim 1 in which the coating comprises a bonded component and a bonding agent.

3. An electrode according to claim 1 in which a silicious coating is used.

4. An electrode comprising a conductive base and a porous, adherent, acid-resisting coating therefor, said coating comprising a silicious bonded component and a silicious bonding agent.

5. An electrode comprising a conductive base and a porous, adherent, acid-resisting coating therefor, said coating comprising infusorial earth and a silicious bonding agent.

In testimony whereof, I affix my signature.

RALPH H. McKEE.